(12) United States Patent
Giesen et al.

(10) Patent No.: US 9,003,697 B2
(45) Date of Patent: Apr. 14, 2015

(54) GREENHOUSE SYSTEM

(75) Inventors: Leon Giesen, Helmond (NL); Gied Rutten, Lottum (NL); Volker Geyer, Niederkrüchten (NL); Valentino Villari, Mönchengladbach (NL)

(73) Assignee: Scheuten S.A.R.L., Venlo (NL)

( * ) Notice: Subject to any disclaimer, the term of this patent is extended or adjusted under 35 U.S.C. 154(b) by 499 days.

(21) Appl. No.: 12/679,751

(22) PCT Filed: Sep. 12, 2008

(86) PCT No.: PCT/EP2008/007504
§ 371 (c)(1),
(2), (4) Date: Mar. 24, 2010

(87) PCT Pub. No.: WO2009/043433
PCT Pub. Date: Apr. 9, 2009

(65) Prior Publication Data
US 2010/0257782 A1    Oct. 14, 2010

(30) Foreign Application Priority Data

Sep. 28, 2007   (EP) ...................... 07019138

(51) Int. Cl.
*A01G 9/14* (2006.01)
*B32B 17/10* (2006.01)

(52) U.S. Cl.
CPC ........ *A01G 9/1438* (2013.01); *B32B 17/10055* (2013.01); *B32B 17/10229* (2013.01); *B32B 17/10761* (2013.01)

(58) Field of Classification Search
CPC .................................................. A01G 9/1438
USPC ................ 47/17, 19.1, 19.2, 20.1, 29.1, 29.2, 47/29.3, 29.4
See application file for complete search history.

(56) References Cited

U.S. PATENT DOCUMENTS

| | | | | |
|---|---|---|---|---|
| 4,462,390 A | * | 7/1984 | Holdridge et al. | 126/587 |
| 4,486,977 A | * | 12/1984 | Edgecombe et al. | 47/59 R |
| 4,559,381 A | * | 12/1985 | Tapia et al. | 524/405 |
| 5,197,242 A | * | 3/1993 | Baughman et al. | 52/171.3 |
| 5,443,669 A | * | 8/1995 | Tunker | 156/102 |
| 5,524,381 A | * | 6/1996 | Chahroudi | 47/17 |
| 5,557,462 A | * | 9/1996 | Hartig et al. | 359/585 |
| 6,280,847 B1 | * | 8/2001 | Corkhill et al. | 428/423.1 |

(Continued)

FOREIGN PATENT DOCUMENTS

| | | |
|---|---|---|
| DE | 3314922 A1 | 8/1984 |
| EP | 0747330 A1 | 12/1996 |

(Continued)

OTHER PUBLICATIONS

PCT International Search Report for PCT/EP2008/007504, International Filing Date Sep. 12, 2008, pp. 11.

(Continued)

*Primary Examiner* — Rob Swiatek
*Assistant Examiner* — Ebony Evans
(74) *Attorney, Agent, or Firm* — International IP Law Group, PLLC (57) ABSTRACT

There is provided a greenhouse system. An exemplary greenhouse system comprises at least one plant culture. At least part of a glazing of the greenhouse system comprises at least one functional layer that is adapted to the plant culture.

25 Claims, 2 Drawing Sheets

(56) References Cited

U.S. PATENT DOCUMENTS

| | | | |
|---|---|---|---|
| 6,466,298 B1 * | 10/2002 | Fix et al. | 349/195 |
| 6,740,211 B2 | 5/2004 | Thomsen et al. | |
| 8,057,703 B2 * | 11/2011 | Naum et al. | 252/301.4 F |
| 8,549,787 B2 * | 10/2013 | Aikala | 47/58.1 LS |
| 2004/0144023 A1 * | 7/2004 | Bruckner et al. | 47/29.4 |
| 2006/0254135 A1 * | 11/2006 | Dubuc | 47/17 |

FOREIGN PATENT DOCUMENTS

| | | |
|---|---|---|
| EP | 0759566 A1 | 2/1997 |
| EP | 1652422 A2 | 5/2006 |
| EP | 1889818 A1 | 2/2008 |
| GB | 2165547 A | 4/1986 |
| WO | WO2004/077935 A1 | 9/2004 |

OTHER PUBLICATIONS

Anonymous, Gigahertz Optik Catalog/Tutorials: Chapter VI.2—Plant physiology, Document No. XP-002471970, Internet: URL:http://www.gigahertz-optik.com/database_en/html/applications-tutorials/tutorials/vi.-applications-for-light-measurement-in-medicine-technology-industry-and-environmental-science/vi.2-plant-physiology.html>, pp. 4.

* cited by examiner

GREENHOUSE SYSTEM

CROSS REFERENCE TO RELATED APPLICATIONS

Pursuant to 35 U.S.C. §371, this application is the United States National Stage Application of International Patent Application No. PCT/EP2008/007504, filed on Sep. 12, 2008, the contents of which are incorporated by reference as if set forth in their entirety herein, which claims priority to European (EP) Patent Application No. 07019138.2, filed Jul. 28, 2007, the contents of which are incorporated by reference as if set forth in their entirety herein.

BACKGROUND

It is a known procedure to cultivate plants in greenhouses. Glass, especially silicate glass or horticultural cast glass, for example, is used for the glazing of these greenhouses.

Preference is usually given to the use of horticultural cast glass since, thanks to its structure, it protects the plants from being burned by direct sunlight and provides diffused light for the plant culture.

The insulation of greenhouses glazed in this manner, however, is usually inadequate. As a result, a great deal of energy is needed to cool these greenhouses in the summer and in turn, a great deal of energy is also needed to heat these greenhouses in the winter.

The use of insulating glass for the glazing of greenhouses is not very widespread since the light transmittance of insulating glass is about 10% less than that of single glass. As a result, a lower yield is expected.

In this context, the transmittance of the greenhouse or of the glazing employed plays an important role over the entire wavelength range, since 1% more transmittance usually translates into a 1% greater yield of the plant culture.

However, glass-like polymer materials are now also being used more and more often for the glazing of greenhouses.

These materials have the advantage that, in comparison to glass, they are lightweight, unbreakable and are usually produced in the form of sandwich panels, hollow chamber panes or else as so-called double skin sheets or even triple skin sheets.

However, these materials also have considerable drawbacks since they can, at times, be transparent to UV light, thus contributing to burning of the plant cultures when the light radiation is strong. Moreover, these materials are not very UV-stable and they age when exposed to constant light radiation. Moreover, the insulation of sandwich panels, hollow chamber panes or so-called double skin sheets or even triple skin sheets is inefficient in comparison to insulating glass.

In view of these advantages and disadvantages of the various materials used for glazing, it can be difficult to attain optimal conditions that are adapted to the specific cultivated plants for a given plant culture.

SUMMARY OF THE INVENTION

Exemplary embodiments of the present invention relate to a greenhouse system comprising at least one plant culture, whereby at least part of the glazing of the greenhouse system comprises at least one functional layer that is adapted to this plant culture.

In addition, an exemplary embodiment of the present invention provides a greenhouse system that ensures optimal conditions for the specific plant culture.

One exemplary embodiment of the present invention relates to a greenhouse system comprising at least one plant culture, whereby at least part of the glazing of the greenhouse system comprises at least one functional layer that is adapted to this plant culture.

As put forward herein, the term greenhouse system includes all types of translucent constructions such as, for example, greenhouses, glasshouses, hothouses, film tunnels or combinations thereof, that permit the protected cultivation of plants preferably comprising at least one plant culture. In this context, the greenhouse system can comprise at least one, but also a plurality of various translucent constructions that are connected to each other in some manner, for example, by passages, corridors, tunnels, doors, gates or locks. The individual translucent constructions that permit the protected cultivation of plants can be in the form of, for example, individual structures (each with four exposed walls), serial structures (with at least one shared partition between two adjacent constructions) or block structures (as contiguous blocks with exterior walls, but without partitions between adjacent constructions).

Glazing or glass or a glass pane or a glass sheet as set forth in accordance with an exemplary embodiment of the present invention comprises not only all types of glass but also polymer materials that are transparent and/or glass-like or amorphous, also in the visible wavelength range such as, for instance, polycarbonate, polymethylmethacrylate, polyethylene, PVC, polystyrene. In this context, transparent can mean that the transmittance in the visible wavelength range is greater than 25%, preferably 50%.

A plant culture as set forth in accordance with an exemplary embodiment of the present invention encompasses at least one plant, but preferably two or more preferably adjacent plants, that are being cultivated. In this context, a plant culture can also comprise different or especially preferably identical plants.

Moreover, the greenhouse system can also comprise several identical or especially preferably, different plant cultures.

A part of the glazing of the greenhouse system as set forth herein refers to at least one section of the glazing of the greenhouse system, that is to say, for example, at least one glass sheet used for the glazing. Thus, terms like "a part of the glazing" as set forth herein especially preferably refer to the roof glazing of the greenhouse system or to a part thereof.

A part of the glazing of the greenhouse system as set forth herein can amount to preferably at least 5%, preferably at least 10%, also preferably at least 15%, also preferably at least 20%, also preferably at least 25%, also preferably at least 30%, also preferably at least 35%, also preferably at least 40%, also preferably at least 45%, especially preferably at least 50% of the glazing and especially of the roof glazing of the greenhouse system.

A part of the glazing of the greenhouse system as set forth herein can amount to up to 55%, preferably up to 60%, also preferably up to 65%, also preferably up to 70%, also preferably up to 75%, also preferably up to 80%, also preferably up to 85%, also preferably up to 90%, also preferably up to 95%, especially preferably up to 100% of the glazing and especially of the roof glazing of the greenhouse system.

The term adapted to a plant culture as set forth herein can mean that at least one property of a part of the glazing of the greenhouse system approaches the specific optimum for this plant culture, thanks to at least one functional layer. In this context, for example, especially the fraction of diffused transmitted light and/or the transmittance of the glazing in at least a given wavelength range approaches the specific optimum for this plant culture, thanks to at least one functional layer.

The optimum for a specific plant culture can correspond to the optimum for the plant of this culture. If the plant culture comprises different plants, then the optimum for the plant culture can also be the mean value of the optima for the various plants, optionally taking into account their percentage in the plant culture.

The optimum in terms of the fraction of diffused transmitted light depends on the particular plant culture or on the particular plants. The fraction of diffused transmitted light or of transmitted scattered light as set forth herein can be the fraction of light radiation, especially sunlight that, after it has passed through the glazing (that is to say, has been transmitted), reaches the interior of the greenhouse system as scattered light or diffused light in which the individual light rays are essentially not (or not any longer) oriented in parallel to each other. Here, the optionally original parallel orientation can be disrupted by scattering, especially by volume scattering, for example, due to reflections, refraction phenomena or interference phenomena.

The optimal transmittance in certain wavelength ranges depends on the particular plant culture or on the particular plants. In general, however, it can be said that a high transmittance is needed for plant growth.

However, for each plant, there is a fairly individual so-called PAR (Photosynthetically Active Radiation) range of the electromagnetic spectrum. The PAR range is the wavelength range that can contribute to the growth of the particular plant culture or of the particular plant, since it can be used for photosynthesis.

The PAR range usually comprises, for example, a wavelength range from 300 nm to 800 nm, preferably from 400 nm to 700 nm. Within this range, certain wavelengths contribute very efficiently to photosynthesis and thus to plant growth. The yellow-orange light in the wavelength range between approximately 550 nm and 600 nm, especially between 600 nm and 650 nm, is especially efficient in this context. Red light in the wavelength range between approximately 650 nm and 700 nm is also very efficient. Blue/green light in the wavelength range between approximately 400 nm and 475 nm is likewise efficient. However, green/yellow light in the wavelength range between approximately 475 nm and 550 nm is less efficient. Moreover, differences from one plant culture to another or from one plant to another should also be taken into consideration.

Nevertheless, plants require the most balanced light spectrum possible. An insufficient fraction of blue light causes the plant to "shoot" (excess stem growth) or causes its leaves to turn yellow. The ratio of red to deep red is also important for plant development. A low deep red fraction inhibits stem growth. This sensitivity can differ from one plant culture to another or from one plant to another.

A functional layer can comprise, for example, any layer that, in any way, changes and/or influences the transmittance of glazing in at least one specific wavelength range or the fraction of diffused transmitted light.

In an especially preferred embodiment of the invention, a functional layer can comprise, for example, at least one metal and/or metal oxide layer. Such a layer for adapting the transmittance of at least part of the glazing of the inventive greenhouse system to the PAR range of the particular plant culture can be, for example, a low-e coating that is specially adapted to the particular plant culture, that normally only reflects and/or absorbs infrared rays, and that, however, can be used here to adapt the transmittance to the PAR range of the particular plant culture or to influence the transmittance, the reflection and the absorption over the entire wavelength range. Such a coating can comprise at least one metal and/or metal oxide layer.

The thickness of the metal and/or metal oxide layer here can be, for example, between 1 nm and 65 nm, preferably between 3 nm and 50 nm, also preferably between 4 and 40 nm, also preferably between 5 nm and 30 nm, also preferably between 6 nm and 25 nm, also preferably between 7 nm and 20 nm, especially preferably between 8 nm and 15 nm.

In a preferred exemplary embodiment of the present invention, a functional layer can comprise at least two metal and/or metal oxide layers. In another preferred exemplary embodiment of the present invention, a functional layer can comprise at least two metal and/or metal oxide layers of different thicknesses. By varying the individual layer thicknesses, an adaptation to the PAR range of the particular plant culture or a high transmittance can be achieved in the wavelength ranges from 400 nm to 475 nm and from 600 nm to 700 nm, which are important since they are especially efficient for photosynthesis. The more layers are used, the more parameters can be changed and/or optionally coordinated with each other so as to allow an especially flexible and/or efficient and/or precise adaptation to the PAR range of the particular plant culture or else so as to allow a high transmittance in the in the wavelength ranges from 400 nm to 475 nm and from 600 nm to 700 nm, which are important since they are especially efficient for photosynthesis.

In a preferred exemplary embodiment of the present invention, a functional layer can comprise at least one silver layer. This silver layer can influence the reflection and the transmittance of at least part of the glazing of the greenhouse system according to the invention over the entire wavelength range.

The thickness of the silver layer can be, for example, between 2.5 nm and 30 nm, preferably between 3 nm and 25 nm, also preferably between 3.5 and 20 nm, also preferably between 4 nm and 15 nm, also preferably between 4.5 nm and 14 nm, especially preferably between 5 nm and 13 nm.

The transmittance of a thin silver layer is generally greater than that of a thicker silver layer. Moreover, especially in the wavelength range between 600 nm and 800 nm, the transmittance of a thin silver layer is greater than that of a thicker silver layer.

By varying the thickness of the silver layer, the transmittance of the glazing can be adapted to the PAR range of the particular plant culture or of the particular plant. Moreover, as a result, a high transmittance can be achieved in the wavelength ranges from 400 nm to 475 nm and from 600 nm to 700 nm, which are important since they are especially efficient for photosynthesis. Moreover, the transmittance of infrared radiation can also be reduced by a silver layer. Consequently, heating up of the greenhouse system can be reduced, for example, in case of intense light radiation. However, it should be taken into account that the silver layer(s) according to the present invention is/are used in order to adapt the transmittance of the glazing to the PAR range of the particular plant culture or of the particular plant, or else in order to achieve a high transmittance in the wavelength ranges from 400 nm to 475 nm and from 600 nm to 700 nm, which are important since they are especially efficient for photosynthesis. If a higher transmittance in the infrared spectrum or discolorations in comparison to a conventional silver layer used as a low-e coating result from this, then this can be accepted in order to achieve an especially good adaptation to the PAR range of the particular plant culture or of the particular plant, or else in order to achieve a high transmittance in the wavelength ranges from 400 nm to 475 nm and from 600 nm to 700 nm, which are important since they are especially efficient for photosynthesis.

In an especially preferred exemplary embodiment of the greenhouse system according to the present invention, at least part of the glazing of the greenhouse system can comprise an additional second silver layer.

By varying the thicknesses of the silver layers and by coordinating them with each other, the transmittance of the glazing can be adapted especially flexibly and/or efficiently and/or precisely to the PAR range of the particular plant culture or of the particular plant. Moreover, as a result, a high transmittance can be achieved flexibly and/or efficiently and/or precisely in the wavelength ranges from 400 nm to 475 nm and from 600 nm to 700 nm, which are important since they are especially efficient for photosynthesis. This is possible because, when two silver layers are present, the thickness of both silver layers can be modified. Consequently, there are more parameters that can be modified and/or coordinated with each other so as to allow an especially flexible and/or efficient and/or precise adaptation to the PAR range of the particular plant culture or of the particular plant or else so as to allow a high transmittance in the in the wavelength ranges from 400 nm to 475 nm and from 600 nm to 700 nm, which are important since they are especially efficient for photosynthesis.

Moreover, at least part of the glazing of the greenhouse system can comprise at least one tin oxide layer. The tin oxide layer can serve as an interference layer that can influence the color, reflection and transmittance of the layer system. An increase in the thickness of this layer can lead, for example, to an increase in the reflection and a reduction in the transmittance. Moreover, this layer also influences the transmittance in the blue range. The transmittance in the blue range can be increased by a very small layer thickness.

Moreover, at least part of the glazing of the greenhouse system can comprise at least one zinc oxide layer. Here, the zinc oxide layer can likewise serve as an interference layer that can influence the color, reflection and transmittance of the layer system. An increase in the thickness of this layer can lead, for example, to an increase in the reflection and a reduction in the transmittance. Moreover, a zinc oxide layer can also serve as a crystallization base for the silver layer. By using a zinc oxide layer as the crystallization base for a silver layer, a silver layer can be obtained that allows an especially high transmittance with a concurrently especially good insulation or low transmittance in the infrared spectrum. Moreover, zinc oxide layers can also be doped with aluminum. As a result, the resistance of the zinc oxide layer against corrosion or oxidation can be increased.

Moreover, at least part of the glazing of the greenhouse system can comprise at least one $NiCrO_x$ layer. This is a sub-stoichiometric oxide layer in which x can therefore preferably be <4. The $NiCrO_x$ layer can protect an adjacent silver layer against corrosion or oxidation. Consequently, it can ensure that the silver layer can retain its function over a very long period of time. A variation of the layer thickness can also influence the transmittance, especially in the wavelength range above 700 nm, since the $NiCrO_x$ layer absorbs part of the radiation, especially in the wavelength range above 700 nm. Here, a thicker $NiCrO_x$ layer leads to a reduced transmittance.

Moreover, at least part of the glazing of the greenhouse system can comprise at least one $ZnSnAlO_x$ layer. This is a sub-stoichiometric oxide layer in which x can therefore preferably be <4. Here, the $ZnSnAlO_x$ layer serves, for example, to protect the entire layer structure against corrosion or oxidation. Furthermore, however, this layer likewise influences the transmittance and the reflection. Here, a thicker $ZnSnAlO_x$ layer leads to an increased reflection and to a reduced transmittance.

By way of an example, a functional layer could have the following structure:
a tin oxide layer,
a zinc oxide layer doped with aluminum,
a silver layer,
a $NiCrO_x$ layer,
a tin oxide layer,
a $ZnSnAlO_x$ layer,
a tin oxide layer,
a zinc oxide layer doped with aluminum,
a silver layer,
a $NiCrO_x$ layer,
a tin oxide layer,
a $ZnSnAlO_x$ layer.

The layer structure that is arranged between the two silver layers and that comprises a $NiCrO_x$ layer, a tin oxide layer, a $ZnSnAlO_x$ layer, another tin oxide layer, another zinc oxide layer doped with aluminum, can serve as an anti-reflective coating for the silver layers. An increase in the thickness of this layer structure can lead to more reflection and less transmittance.

In contrast to this, an increase in the thickness of the layer structures that are arranged above or below the two silver layers and that each comprise a tin oxide layer and a zinc oxide layer doped with aluminum or an $NiCrO_x$ layer, a tin oxide layer and a $ZnSnAlO_x$ layer would lead to less reflection and more transmittance.

The thickness of each of these layers can be, for example, between 1 nm and 65 nm, preferably between 3 nm and 50 nm, also preferably between 4 nm and 40 nm, also preferably between 5 nm and 30 nm, also preferably between 6 nm and 25 nm, also preferably between 7 nm and 20 nm, especially preferably between 8 nm and 15 nm The more layers are used, the more parameters can be changed and/or optionally coordinated with each other so as to allow an especially flexible and/or efficient and/or precise adaptation to the PAR range of the particular plant culture or of the particular plant or else so as to allow a high transmittance in the in the wavelength ranges from 400 nm to 475 nm and from 600 nm to 700 nm, which are important since they are especially efficient for photosynthesis. The effects of certain parameters can once again completely or partially compensate for the effects of other parameters.

The thickness of each individual layer can be modified so as to allow an especially flexible and/or efficient and/or precise adaptation to the PAR range of the particular plant culture or of the particular plant or else so as to allow a high transmittance in the in the wavelength ranges from 400 nm to 475 nm and from 600 nm to 700 nm, which are important since they are especially efficient for photosynthesis. Moreover, each of these layers can be produced, for example, by means of sputtering or vapor-deposition.

Furthermore, a functional layer can also comprise a layer that influences the fraction of diffused transmitted light. For example, such a functional layer can comprise, for instance, a roughened glass pane or a frosted glass pane, a translucent glass pane with pigments, a horticultural cast glass pane, a roughened polymer film or a translucent polymer film. The rougher the glass pane or the polymer film, the higher the fraction of diffused transmitted light. Moreover, the fraction of diffused light can be varied on the basis of the texture or structure of the horticultural cast glass. As an alternative, the fraction of diffused transmitted light can also be varied by using another translucent polymer material or by modifying the fraction or the type of the pigments in and/or on the polymer material or in and/or on the glass pane. For example, a translucent polyvinyl butyral (PVB) film can be used as the functional layer in order to increase the fraction of diffused transmitted light.

The word translucent as set forth in the present invention can refer to the partial light permeability of a body, along with scattering, and especially volume scattering, of the light rays passing through. In order to make a distinction from transparency, one can describe translucence as permeability to light, and transparency as permeability to images and view. The volume scattering can arise, for example, in that translucent bodies are partially light-permeable. In contrast to opaque bodies, they therefore do not reflect incident light directly on their surface but rather partially only once the light has penetrated the body. Here, the volume scattering occurs in that the light is not only reflected at the point of entry at an angle that is equal to the angle of entry in the opposite direction, but the light also exits at any point in any direction at any angle as a result of the reflection, so that the optionally present parallel orientation of the light rays of the incident light is disrupted.

Here, the fraction of diffused transmitted light can be varied between 0% and 100%, preferably between 5% and 95%, also preferably between 10% and 90%, also preferably between 15% and 85%, also preferably between 20% and 80%, also preferably between 25% and 75%, also preferably between 30% and 70%, also preferably between 35% and 65%, also preferably between 40% and 60%, especially preferably between 45% and 55%.

Thanks to different materials and parameters such as, for example, the roughness, thanks to the use of pigments and/or the type of pigments and/or the fraction of pigments, the fraction of diffused transmitted light can very well approach the optimum for the particular plant culture or for the particular plant.

In an exemplary embodiment of the greenhouse system according to the invention, at least one functional layer that influences the fraction of diffused transmitted light can be arranged inside the laminated safety glass pane. This is possible since, for example, a translucent PVB film can be used as the functional layer that influences the fraction of diffused transmitted light. In this case, this translucent PVB film joins the two glass panes of the laminated safety glass pane as firmly to each other as a transparent PVB film does.

In another exemplary embodiment of the greenhouse system according to the invention, at least one functional layer can be applied onto a glass pane of the glazing of the greenhouse system, the glass pane being near the exterior of the greenhouse system, and especially applied onto the inside of this glass pane. As a result, the insulation of the interior of the greenhouse system can optionally be improved or else the transmittance in the infrared spectrum can be reduced. Thanks to the special arrangement of the functional layer, the heating up of the interior of the greenhouse system, for example, in case of intense light radiation can optionally be reduced since less infrared radiation penetrates into the greenhouse.

In another exemplary embodiment of the greenhouse system according to the invention, at least one functional layer can be applied onto a glass pane of the glazing of the greenhouse system, the glass pane being near the interior of the greenhouse system, and especially applied onto the inside of this glass pane. As a result, the insulation of the interior of the greenhouse system can optionally be improved or else the transmittance in the infrared spectrum can be reduced. Thanks to this special arrangement of the functional layer, the cooling off of the interior of the greenhouse system, for example, in case of low light radiation can optionally be reduced since less infrared radiation leaves the greenhouse.

In another exemplary embodiment of the greenhouse system according to the invention, at least part of the glazing of the greenhouse system can comprise at least two glass panes that are arranged in parallel and joined to each other, thus forming at least one sealed interstice, especially forming insulated glazing. Here, at least two glass panes that are arranged in parallel and joined to each other, which form at least one sealed interstice, are arranged at a distance from each other in order to form insulated glazing. Here, one of the glass panes can also be a laminated safety glass pane that comprises two glass panes firmly joined together by a polymer film and especially by a polyvinyl butyral (PVB) film. Moreover, at least part of the glazing of the greenhouse system according to the invention can also comprise at least three glass panes that are arranged in parallel and joined to each other, thus forming at least two sealed interstices.

In the interstice between the glass panes of the insulating glass arranged at a distance from each other, for example, negative pressure or a vacuum can prevail. As an alternative, the interstice between the glass panes of the insulating glass arranged at a distance from each other can be filled with a gas or a gas mixture such as, for example, air, Ar, Xe, Kr or mixtures thereof. The distance between two glass panes arranged at a distance from each other in parallel and joined to each other in order to form insulated glazing can be, for instance, between 4 mm and 30 mm, preferably between 6 mm and 20 mm, also preferably between 7 mm and 18 mm, also preferably between 8 mm and 16 mm, also preferably between 10 mm and 14 mm, especially preferably between 12 mm and 13 mm. Since at least part of the glazing of the greenhouse system comprises at least two glass panes arranged in parallel and joined to each other, which form at least one sealed interstice, and especially insulated glazing, the insulation of the greenhouse system can be greatly improved. This reduces the energy costs for heating or cooling the greenhouse system.

In another exemplary embodiment of the greenhouse system according to the invention, at least part of the glazing of the greenhouse system can comprise an break-proof layer. Preferably, an break-proof layer can comprise at least one polymer film arranged between two glass panes, whereby the polymer film preferably joins the two glass panes firmly to each other. As a result, breakage of the glazing and especially breaking through the glazing, if it is stepped on, for example, during cleaning work, can be largely prevented.

In an especially preferred exemplary embodiment of the greenhouse system according to the invention, at least part of the glazing of the greenhouse system can comprise at least one polyvinyl butyral film arranged between two glass panes that preferably joins the two glass panes firmly to each other, so that at least part of the glazing of the greenhouse system comprises at least one laminated safety glass pane arrangement. As a result, breakage of the glazing and especially breaking through the glazing, if it is stepped on, for example, during cleaning work, can be largely prevented. Here, the laminated safety glass pane can preferably be arranged near the outside of the glazing of the greenhouse system according to the invention.

In an especially preferred exemplary embodiment of the greenhouse system according to the invention, at least part of the glazing of the greenhouse system can comprise at least one measure for reducing the light reflection. Any coating or treatment that reduces the reflection of light, and especially of light in the PAR range, can be used as a measure for reducing the light reflection. In particular, for example, the surface of a glass pane can be slightly roughened, for example, by means of etching, in order to reduce the reflection. Moreover, in order to reduce light reflection, for instance, a layer or layer structure can be used that is based on $SiO_2$ and $TiO_2$, and especially a four-layer structure comprising a layer of $SiO_2$, a layer of $TiO_2$ arranged over that, another layer of $SiO_2$ arranged over that and finally, a layer of $TiO_2$ arranged over that, or else a coating with $SiO_2$ nanoparticles or gels thereof. A measure for reducing the light reflection can generally increase the transmittance, so that more light strikes the plant culture. Here, it should be taken into account that more light also means a higher crop yield. Here, a measure for reducing the light reflection can preferably be implemented on the outside of the glazing of the greenhouse system.

Moreover, the transmittance can also be influenced by the thickness of the glass panes employed. Thinner glass panes allow a higher transmittance. However, when thinner glass panes are used, care should be taken to ensure that the glazing still has sufficient mechanical stability.

In an especially preferred exemplary embodiment of the greenhouse system according to the invention, at least part of the glazing of the greenhouse system can comprise at least one layer for reducing the formation of condensation water droplets. Such a layer can have, for example, any hydrophobic or superhydrophobic layer. Such a hydrophobic layer can comprise, for example, hydrophobic and especially fluorinated silanes. A layer for reducing the formation of condensation water droplets, which can preferably be applied onto the inside of the glazing of the greenhouse system, can largely prevent damage (formation of brown spots) to the cultivated plants caused by dripping condensation water.

In an especially preferred exemplary embodiment of the greenhouse system according to the invention, at least part of the glazing of the greenhouse system can be configured in such a way that light sources, and especially preferably light-emitting diodes and/or OLED films that preferably emit in the PAR range of the particular plant culture, are either integrated into the glazing itself (for example, as light-emitting diodes inside insulated glazing, especially distributed over the surface of this glazing), or else they can be installed on the edge of the glazing, especially, for example, inside the frame of the glazing, so that they can irradiate the glazing and especially the plant culture(s) located underneath the glazing. As a result, the plant growth can also be stimulated when the light radiation is weak, particularly during the night. This translates into faster plant growth and a higher yield.

In an especially preferred exemplary embodiment of the greenhouse system according to the invention, the greenhouse system can comprise at least two different zones. In this context, a zone can be any part of a greenhouse system that differs from at least one adjacent part by at least one property. In particular, one zone of the greenhouse system can differ from at least one adjacent zone, for example, in terms of the temperature, the humidity, the plant culture that is present, the logistical design and the type of glazing. As a result, several different plant cultures can be cultivated under optimal conditions in one single greenhouse system.

In an especially preferred exemplary embodiment of the greenhouse system according to the invention, the greenhouse system can comprise at least two different zones with different glazing which, thanks to different functional layers according to the invention is adapted to the plant culture that is present in a given zone. As a result, several different plant cultures can be cultivated under optimal conditions with a high yield in one single greenhouse system.

DETAILED DESCRIPTION OF SPECIFIC EMBODIMENTS

Figure 1:
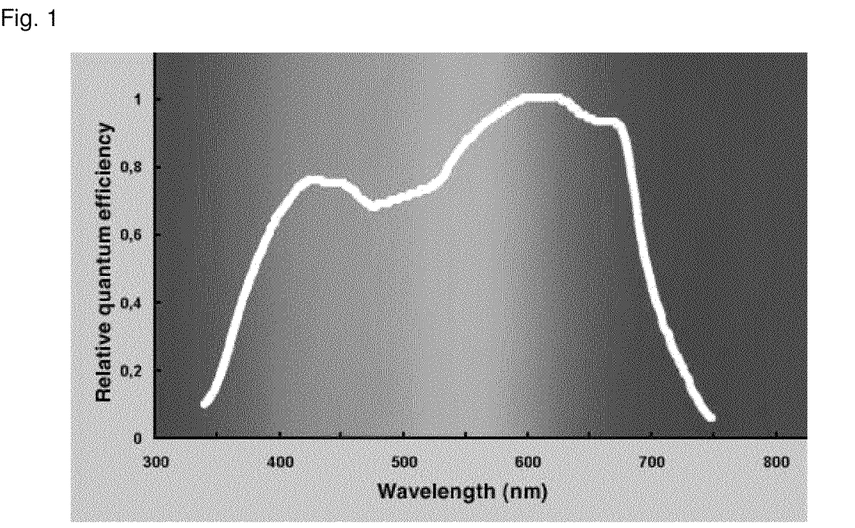
FIG. 1 is a graph that shows the efficiency of electromagnetic radiation for photosynthesis as a function of the wavelength.

FIG. 1 shows the efficiency of electromagnetic radiation for photosynthesis as a function of the wavelength. The PAR range usually comprises, for example, a wavelength range from 300 nm to 800 nm, preferably from 400 nm to 700 nm. Within this range, certain wavelengths still contribute especially efficiently to photosynthesis and thus to plant growth. The yellow/orange light in the wavelength range between approximately 550 nm and 600 nm, especially between 600 nm and 650 nm, is particularly efficient in this context. Red light in the wavelength range between approximately 650 nm and 700 nm is also very efficient. Blue/green light in the wavelength range between approximately 400 nm and 475 nm is likewise efficient. However, green/yellow light in the wavelength range between approximately 475 nm and 550 nm is less efficient. Moreover, differences from one plant culture to another or from one plant to another should also be taken into consideration.

Figure 2:
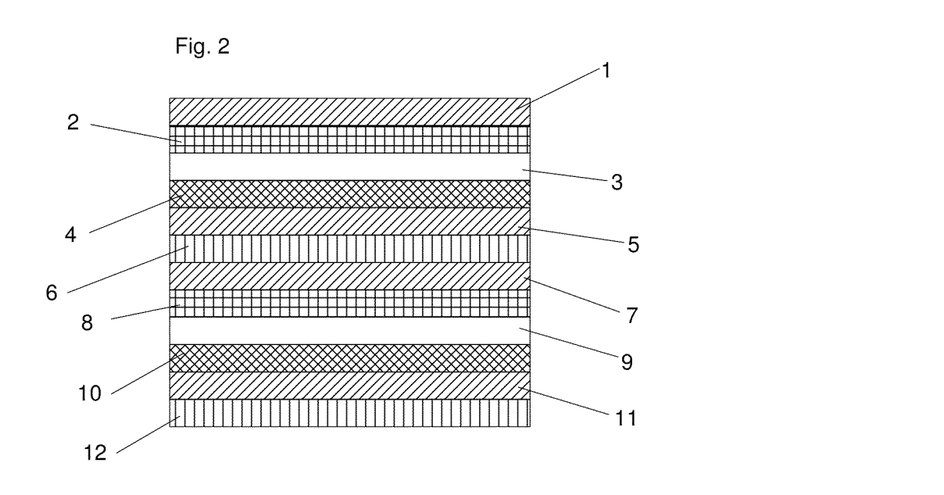
FIG. 2 is a block diagram of a layer structure for a functional layer that can influence the transmittance of the glazing according to an exemplary embodiment of the present invention.

By way of an example, FIG. 2 shows a layer structure for a functional layer that can influence the transmittance of the glazing. The layer structure comprises the following layers:
a tin oxide layer (1),
a zinc oxide layer doped with aluminum (2),
a silver layer (3),
a $NiCrO_x$ layer (4),
a tin oxide layer (5),
a $ZnSnAlO_x$ layer (6),
a tin oxide layer (7),
a zinc oxide layer doped with aluminum (8),
a silver layer (9),
a $NiCrO_x$ layer (10),
a tin oxide layer (11),
a $ZnSnAlO_x$ layer (12).

Figures 3, 3B:
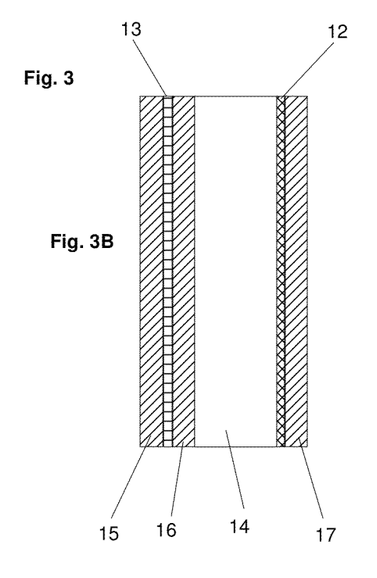
FIG. 3B is a block diagram of a greenhouse system according to an alternative exemplary embodiment of the present invention.

By way of an example, FIG. 3 shows two structures that can be used for at least one part of the glazing of a greenhouse system according to an exemplary embodiment of the present invention.

Figure 3A:
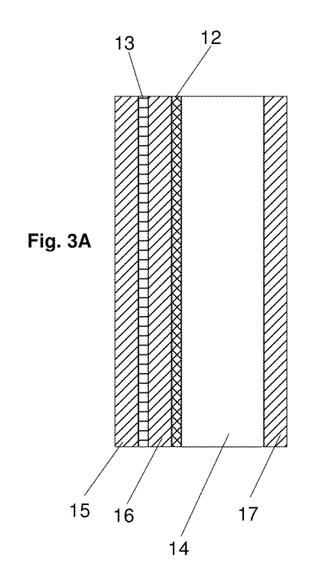
FIG. 3A is a block diagram of a greenhouse system according to an exemplary embodiment of the present invention.

FIG. 3A shows a greenhouse system according to an exemplary embodiment of the present invention in which at least one functional layer (12) is applied onto the inside of a glass pane (16) of the glazing of the greenhouse system, said glass pane being near the exterior of the greenhouse system.

FIG. 3B shows another greenhouse system according to an exemplary embodiment of the present invention in which at least one functional layer (12) is applied onto the inside of a glass pane (17) of the glazing of the greenhouse system, said glass pane being near the interior of the greenhouse system.

1) A greenhouse system comprising an orchid culture, whereby the roof glazing of the greenhouse system comprises at least one functional layer that is adapted to this orchid culture. In this context, such a greenhouse system according to the invention comprises—as a functional layer—a translucent PVB film that increases the fraction of diffused transmitted light to approximately 50%. This film—as the functional layer—can be applied, for example, to the inside of a glass pane that is near the interior of the greenhouse system (in this case, the pane of the insulated glazing facing the interior of the greenhouse system), or especially preferably inside the laminated safety glass pane, so that the translucent PVB film joins the two glass panes of the laminated safety glass pane firmly to each other. The high fraction of diffused transmitted light achieved in this manner is especially important for orchid cultures since they do not thrive under exposure to direct sunlight.

Moreover, such a greenhouse system according to the invention can comprise—as a functional layer—a layer structure that is configured, for instance, as follows:
a 17.3 nm-thick tin oxide layer,
a 6.5 nm-thick zinc oxide layer doped with aluminum,
a 12.8 nm-thick silver layer,
a 6 nm-thick $NiCrO_x$ layer,
a 28.5 nm-thick tin oxide layer,
a 9.2 nm-thick $ZnSnAlO_x$ layer,
a 22 nm-thick tin oxide layer,
a 6.2 nm-thick zinc oxide layer doped with aluminum,
a 13.2 nm-thick silver layer,
a 4.9 nm-thick $NiCrO_x$ layer,
a 10.9 nm-thick tin oxide layer,
a 7 nm-thick $ZnSnAlO_x$ layer.

This layer structure offers a high transmittance in the PAR range from 400 nm to 700 nm that is relevant for orchids, along with low transmittance in the infrared spectrum. This is especially important for orchid cultures since they do not thrive under excessive radiation in the infrared spectrum.

This layer structure can preferably be applied onto the inside of a glass pane (thus in this case, the laminated safety glass pane) of the glazing of the greenhouse system, said glass pane being near the exterior of the greenhouse system. As a result, the greenhouse system can be prevented from heating up, for example, in case of strong light radiation, which is not desired for orchids.

In this manner, an optimal cultivation of the orchids can be ensured.

Moreover, the glass pane facing the outside of the greenhouse can be configured as a laminated safety glass pane. As a result, breakage of the glazing and especially breaking through the glazing, if it is inadvertently stepped on, for example, during cleaning work, can be prevented.

Finally, this glass pane facing the outside of the greenhouse—in the form of a laminated safety glass pane comprising two glass panes that are firmly joined by a PVB film—can also be part of insulated glazing which is formed by a glass pane that is located near the interior of the greenhouse. As a result, the insulation of the greenhouse system can be improved.

Each of the three glass panes employed here is 4 mm thick. The distance between the two panes of the insulated glazing is 16 mm. The interstice thus formed is filled with an Ar/air mixture made up of 90% Ar.

In particular in the PAR range, the transmittance is especially high. The fraction of diffused transmitted light is 50%.

2) A greenhouse system comprising a tomato culture, whereby the roof glazing of the greenhouse system comprises at least one functional layer that is adapted to this tomato culture.

Such a greenhouse system according to an exemplary embodiment of the present invention—as a functional layer—can comprise a layer structure that is configured, for instance, as follows:
a 33 nm-thick tin oxide layer,
a 6 nm-thick zinc oxide layer doped with aluminum,
a 5.1 nm-thick silver layer,
a 6 nm-thick $NiCrO_x$ layer,
a 28 nm-thick tin oxide layer,
a 9.2 nm-thick $ZnSnAlO_x$ layer,
a 26 nm-thick tin oxide layer,
a 6 nm-thick zinc oxide layer doped with aluminum,
a 10 nm-thick silver layer,
a 4.9 nm-thick $NiCrO_x$ layer,
a 21 nm-thick tin oxide layer,
a 7 nm-thick $ZnSnAlO_x$ layer.

This layer structure offers a very high transmittance in the PAR range from 400 nm to 700 nm that is relevant for tomatoes, along with high transmittance in the infrared spectrum (for example, in the wavelength range from 700 nm to 800 nm). This is especially important for tomato cultures since they do not thrive under insufficient radiation in the infrared spectrum and/or inadequate heat.

This layer structure can preferably be applied onto the inside of a glass pane (in this case the glass pane of the insulated glazing facing the interior of the greenhouse system) of the glazing of the greenhouse system, said glass pane being near the interior of the greenhouse system. As a result, it is possible to reduce the cooling off of the greenhouse system caused, for example, by low light radiation, which is not desired for the tomato culture.

Furthermore, a small fraction of diffused transmitted light is desirable for tomatoes since they thrive better under direct exposure to sunlight.

In this manner, an optimal cultivation of the tomatoes can be ensured.

Moreover, the glass pane facing the outside of the greenhouse can be configured as a laminated safety glass pane. As a result, breakage of the glazing and especially breaking through the glazing, if it is inadvertently stepped on, for example, during cleaning work, can be prevented.

Finally, this glass pane facing the outside of the greenhouse—as a laminated safety glass pane comprising two glass panes that are firmly joined by a PVB film—can also be part of insulated glazing, which is formed by a glass pane that is located near the interior of the greenhouse.

Each of the three glass panes employed is 4 mm thick. The distance between the two panes of the insulated glazing is 16 mm. The interstice thus formed is filled with an Ar/air mixture made up of 90% Ar.

Particularly in the PAR range, the transmittance is especially high. The fraction of diffused transmitted light is 0%.

LIST OF REFERENCE NUMERALS

13 PVB film
14 sealed interstice formed inside the insulated glazing
15, 16 and 17 glass panes

What is claimed is:
1. A greenhouse system, comprising:
at least one specific plant culture; and
a glazing of the greenhouse system, at least part of the glazing having at least one functional layer that is configured to ensure conditions for the specific plant culture and whereby said functional layer comprises at least one silver layer and at least one aluminum-doped zinc oxide layer.

2. The greenhouse system recited in claim 1, wherein the functional layer influences the transmittance of the glazing in at least a given wavelength range or influences the fraction of diffused transmitted.

3. The greenhouse system recited in claim 1, wherein the transmittance of the glazing is adapted to ensure conditions for the specific plant culture by varying a thickness of the silver layer.

4. The greenhouse system recited in claim 3, wherein the silver layer is applied onto a glass pane of the glazing of the greenhouse system, the glass pane being near the exterior of the greenhouse system.

5. The greenhouse system recited in claim 3, wherein the silver layer is applied onto a glass pane of the glazing of the greenhouse system, the glass pane being near the interior of the greenhouse system.

6. The greenhouse system recited in claim 3, wherein the at least part of the glazing of the greenhouse system comprises at least two glass panes that are arranged in parallel and joined to each other, thus forming at least one sealed interstice.

7. The greenhouse system recited in claim 1, wherein the at least part of the glazing of the greenhouse system comprises at least two silver layers.

8. The greenhouse system recited in claim 1, wherein the at least part of the glazing of the greenhouse system comprises at least two metal or metal oxide layers of different thicknesses.

9. The greenhouse system recited in claim 1, wherein the at least part of the glazing of the greenhouse system comprises at least one translucent polymer film.

10. The greenhouse system recited in claim 1, wherein at least one functional layer is applied onto a glass pane of the glazing of the greenhouse system, the glass pane being near the exterior of the greenhouse system.

11. The greenhouse system recited in claim 1, wherein at least one functional layer is applied onto a glass pane of the glazing of the greenhouse system, the glass pane being near the interior of the greenhouse system.

12. The greenhouse system recited in claim 1, wherein the at least part of the glazing of the greenhouse system comprises at least two glass panes that are arranged in parallel and joined to each other, thus forming at least one sealed interstice.

13. The greenhouse system recited in claim 1, wherein the at least part of the glazing of the greenhouse system comprises at least one break-proof layer.

14. The greenhouse system recited in claim 1, wherein the at least part of the glazing of the greenhouse system comprises at least one polymer film arranged between two glass panes.

15. The greenhouse system recited in claim 1, wherein the at least part of the glazing of the greenhouse system comprises at least one PVB film arranged between two glass panes.

16. The greenhouse system recited in claim 1, wherein the at least part of the glazing of the greenhouse system comprises at least one laminated safety glass pane arrangement.

17. The greenhouse system recited in claim 1, wherein the at least part of the glazing of the greenhouse system comprises at least one measure for reducing light reflection.

18. The greenhouse system recited in claim 1, wherein the at least part of the glazing of the greenhouse system is configured in such a way that at least one light source is either integrated into the glazing itself or installed on the edge of the glazing, so that it can irradiate the at least one specific plant culture located underneath it.

19. The greenhouse system recited in claim 1, wherein the functional layer influences the transmittance of the glazing in at least a given wavelength range and influences the fraction of diffused transmitted light.

20. The greenhouse system recited in claim 1, wherein the at least part of the glazing of the greenhouse system comprises at least two metal and metal oxide layers of different thicknesses.

21. A greenhouse system comprising:
   at least two different zones;
   at least one specific plant culture; and
   a glazing of the greenhouse system, at least part of the glazing having at least one functional layer that is configured to ensure conditions for the specific at least one plant culture, and whereby said functional layer comprises at least one silver layer and at least one aluminum-doped zinc oxide layer.

22. The greenhouse system recited in claim 21, wherein the at least two different zones have different glazing each of which is configured to ensure conditions for a different plant culture located in that particular zone by virtue of different functional layers.

23. The greenhouse system recited in claim 21, wherein the transmittance of the glazing is adapted to ensure conditions for the specific plant culture of each zone by varying a thickness of the silver layer.

24. A method of operating a greenhouse system, comprising:
   providing at least one specific plant culture; and
   providing a glazing of the greenhouse system, at least part of the glazing having at least one functional layer that is configured to ensure conditions for the specific at least one plant culture, and whereby said functional layer comprises at least one silver layer and at least one aluminum-doped zinc oxide layer.

25. The method recited in claim 24, wherein the at least part of the glazing of the greenhouse system comprises at least one silver layer, whereby the transmittance of the glazing is adapted to ensure conditions for the specific plant culture by varying a thickness of the silver layer.

* * * * *